P. H. SWEET.
GIN OR LINTER SAW AND METHOD OF MAKING SAME.
APPLICATION FILED JAN. 6, 1919.

1,368,368. Patented Feb. 15, 1921.

INVENTOR
Parker H. Sweet
BY John O. Seifert
HIS ATTORNEY

UNITED STATES PATENT OFFICE.

PARKER H. SWEET, OF BOONTON, NEW JERSEY, ASSIGNOR TO THE BARKER-SWEET MANUFACTURING COMPANY, OF JAMAICA, LONG ISLAND, NEW YORK, A CORPORATION OF NEW YORK.

GIN OR LINTER SAW AND METHOD OF MAKING SAME.

1,368,368.  Specification of Letters Patent.  Patented Feb. 15, 1921.

Application filed January 6, 1919. Serial No. 269,773.

*To all whom it may concern:*

Be it known that I, PARKER H. SWEET, a citizen of the United States, and a resident of Boonton, in the county of Morris and State of New Jersey, have invented new and useful Improvements in Gin or Linter Saws and Methods of Making Same, of which the following is a specification.

This invention relates to gin or linter saws, comprising a series of tooth carrying disks mounted in axial and spaced relation upon a shaft. Where these teeth are formed directly upon the disks in order to sharpen the teeth, or to substitute one saw for another when the teeth are broken, the teeth are formed upon a portion arranged to be removably mounted upon the disks thereby not only saving considerable time in renewing of the saws by the removal and replacing of the disks on the shaft, as is the case when the teeth are formed directly upon the disks, but also a saving in material as the disk portion or carrier need not be renewed and may be used indefinitely.

It is the object of the invention to provide an improved tooth carrying member or portion and means to removably mount the same upon the disk, and to the method of making the toothed portion.

In carrying out the invention I provide a strip of material and make therein angular shaped incisions to form saw teeth, said portions extending alternately in opposite directions toward the lateral edges of the strip with the base of the incisions commencing at a line extending preferably longitudinally of and centrally between the lateral edges of the strip, and then bending the strip longitudinally upon itself to substantially channel shape in cross section with the side walls of the channel converging toward each other and the stamped angular portions bent to extend in a direction opposite to such side walls of the channel portion. After the toothed strip is so bent it is hardened whereby the bent side portions of the channel constitute clamping members adapted to engage in annular recessed portions at the periphery and in the opposite walls of the carrier or disk, with the walls of the recesses converging inward from the periphery of the disk to be removably engaged by the converging walls of the channel portion of the toothed member.

In the drawing accompanying and forming a part of this specification, Figure 1 is a plan view of a strip of material from which the toothed member is produced and illustrating the manner of forming the saw teeth from said strip.

Figure 6:
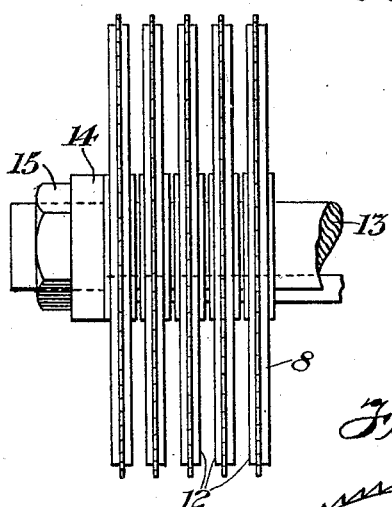
Figure 7:
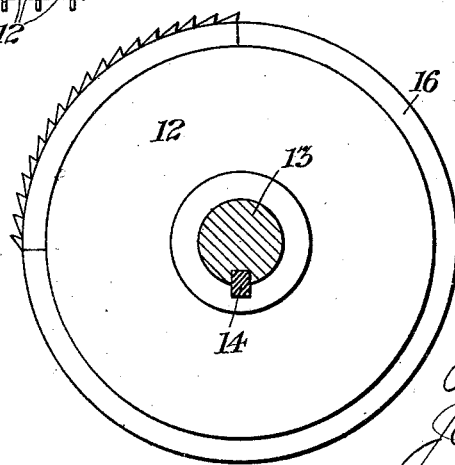

Fig. 6 is an elevational view of a portion of the shaft to show the manner of assembling the toothed member carrying disks upon the shaft to build up the toothed cylinder for cotton gins or linters; and Fig. 7 is a sectional end view of the shaft to show the manner of mounting the disks or carriers upon the shaft to have longitudinal adjustment, and the manner of mounting the toothed member or members upon the disks.

Similar characters of reference designate like parts throughout the different views of the drawing.

Figure 1:
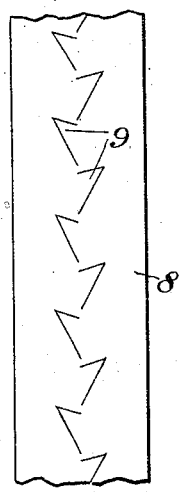
Figure 2:
Fig. 2 is a cross sectional view of the strip shown in Fig. 1 illustrating a further step in the formation of the teeth on the strip.
Figure 3:
Fig. 3 is a cross sectional view showing the manner of bending the strip longitudinally upon itself to adapt it to be removably mounted upon its support.
Figure 4:
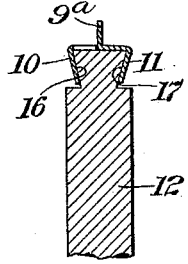
Fig. 4 is a cross sectional view showing the manner of applying the toothed and formed strip to its support.
Figure 5:
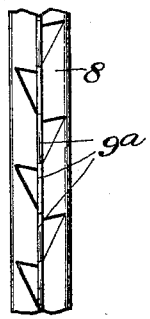
Fig. 5 is a detail view looking at the top of Fig. 4.

In the method of carrying out the invention shown in the drawing a strip of metal 8 is provided with angular incisions 9 in the form of saw teeth with the apex or connecting portion of the incisions of alternate teeth extending in opposite directions toward the lateral edges of the strip with the bases of the incisions commencing in a line extending longitudinally of and centrally between the lateral edges of the strip, and on which line the portions of the metal within the incisions are bent substantially at right angles to the body of the strip to constitute the bases of the teeth, as shown at 9ª in Figs. 2, 3 and 4. The strip is then bent longitudinally upon itself to channel shape in cross section with the side walls 10, 11 of the channel converging toward each other in a direction from the body of the strip, as shown in Figs. 3 and 4, and the teeth extending from the body of the strip in a direction opposite to the side walls of the channel.

Simultaneously with the bending of the strip to channel shape, or previously thereto, the strip is shaped to circular form. After the strip has been formed as set forth the same is subjected to a hardening process.

As stated it is the object of the invention to provide a toothed member adapted to be removably mounted upon a carrier or carriers in a cotton gin or linter, and in Figs. 6 and 7 I have shown a type of a saw cylinder to which my invention is applicable, consisting of a series of disks 12 having a central opening for the engagement of a shaft 13 upon which the disks are mounted in juxtaposed and spaced relation to rotate with the shaft and have axial adjustment thereon by a key 14 engaging in keyways in the respective disks and shaft and are held against endwise movement by washers 14 and nuts 15 threaded onto the ends of the shaft. The channel toothed members are mounted upon the periphery of the disks with the teeth to extend radially from the periphery of the disks as clearly shown in said Figs. 6 and 7.

To lock the toothed members to the periphery of the disks and permit of the removal of the same without the loosening of fastening means or the like the peripheral portions of the disks in opposite faces are provided with annular recesses 16, 17, the walls of which recesses converge or incline inwardly from the periphery of the disks and the inclination of the walls of the recesses being substantially the same as the inclination of the channel walls of the toothed member. The toothed member having been hardened the channel walls will be springy or yieldable having an inherent tension to spring inward and will give sufficiently to readily place them in position upon the periphery of the disks, and when placed upon the disks will operate to clamp and firmly hold said members to the disks. While these toothed members are preferably made of a number of segments to extend around the periphery of the disks, it will be obvious they may comprise a single and continuous member.

Having thus described my invention, I claim:

1. The method of making toothed members, consisting in stamping angular portions from a strip of material with the apex of alternate portions extending in opposite directions toward the lateral edges of the strip and the bases extending in a line longitudinally of and centrally between the lateral edges of the strip, and then bending such angular portions to extend laterally from the body portion of the strip.

2. The method of making toothed members, consisting in making angular incisions in the shape of saw teeth in a strip of material with the bases of the incisions commencing in a line extending longitudinally of and centrally between the lateral edges of the strip and alternate incisions extending in opposite directions from such line, and bending the portions severed within such incisions to extend laterally of the body portion of the strip.

3. The method of making toothed members consisting in making angular incisions in the shape of saw teeth in a strip of material with the apex of alternate incisions extending in opposite directions toward the lateral edges of the strip, and bending the portions severed by such incisions to extend laterally from the strip.

4. The method of making toothed members consisting in making angular incisions in the shape of saw teeth in a strip of material with the apex of alternate incisions extending in opposite directions toward the lateral edges of the strip, bending the portions within such incisions to extend laterally from the strip, and bending the strip substantially to channel shape in cross section with the free ends of the walls converging toward each other for the purpose specified.

5. The method of making toothed members, consisting in making incisions in a strip of material to form angular portions in the shape of saw teeth with the bases of said incisions commencing in a line extending longitudinally of and centrally between the lateral edges of the strip and alternate angular portions extending in opposite directions toward the lateral edges of the strip, bending the body portion of the strip longitudinally upon itself, and bending the angular cut portions to extend from the body of the strip in a direction opposite to the bent body portion of the strip.

6. The method of making toothed members, consisting in making incisions in a strip of material to form angular portions in the shape of saw teeth with the bases of said incisions commencing in a line extending longitudinally of and centrally between the lateral edges of the strip and alternate angular portions extending in opposite directions toward the lateral edges of the strip, bending the body portion of the strip longitudinally upon itself to substantially channel shape in cross section with the lateral walls converging, and bending the angular cut portions to extend from the body of the strip in a direction substantially opposite to the converging bent walls of the strip.

7. The method of making toothed members, consisting in making incisions in a strip of material to form angular portions extending in opposite directions, bending the strip to channel shape in cross section with the walls of the channel converging, and the angular cut portions to extend in a direction opposite to the walls of the channel, and then hardening the member so formed.

8. As a new article of manufacture, a strip of material bent to substantially channel shape in cross section and having teeth stamped therefrom to extend in a direction opposite to the parts forming the channel walls.

9. As a new article of manufacture a strip of material longitudinally bent upon itself to substantially channel shape in cross section with the free ends of the walls converging toward each other, and teeth stamped from the portion of the strip connecting the channel walls to extend in a direction opposite to the walls of the channel portion of the strip.

10. As a new article of manufacture a gin or linter saw, comprising a strip of material bent to channel shape in cross section with the walls converging toward each other, and teeth stamped from the portion of the strip connecting the channel walls and arranged in a line substantially centrally thereof.

11. Gin or linter saws, comprising a disk having recesses at the peripheral portion, and an annular member of channel shape in cross section with teeth stamped therefrom to extend in a direction opposite to the channel walls engaging the peripheral recessed portion of the disk.

12. Gin or linter saws, comprising a disk, and an annular toothed portion of channel shape in cross section to engage the peripheral portion of the disk and formed with teeth to extend radially beyond the periphery of the disk.

13. Gin or linter saws, comprising a disk having opposite recesses extending and converging inward from the periphery; and an annular member of channel shape in cross section with the free ends of the walls of the channel converging toward each other to engage the peripheral recessed portions of the disk to removably clamp said member to the disk to extend around the periphery thereof, and said member being formed with teeth to extend radially from the periphery of the disk when the member is secured thereto.

14. Gin or linter saws, comprising a disk arranged to be mounted upon a shaft and having recesses in the opposite faces extending and converging inward from the periphery, and an annular section of channel shape in cross section with the channel walls converging toward each other to engage the disk recesses to removably clamp the sections to the disk, and said channel sections having teeth stamped from the connecting portion of the channel walls to extend radially from the periphery of the disk.

15. The method of making toothed members consisting in bending a strip of metal to channel shape in cross section with teeth stamped from the connecting portion to extend laterally therefrom.

PARKER H. SWEET.